(12) United States Patent
Lee et al.

(10) Patent No.: US 12,507,493 B2
(45) Date of Patent: Dec. 23, 2025

(54) PIXEL, IMAGE SENSOR AND OPERATING METHOD OF PIXEL

(71) Applicant: SAMSUNG ELECTRONICS CO., LTD., Suwon-si (KR)

(72) Inventors: Mi Ra Lee, Suwon-si (KR); Kyung-Min Kim, Suwon-si (KR); Min-Sun Keel, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 18/389,071

(22) Filed: Nov. 13, 2023

(65) Prior Publication Data

US 2024/0363654 A1 Oct. 31, 2024

(30) Foreign Application Priority Data

Apr. 27, 2023 (KR) .................... 10-2023-0055399
May 25, 2023 (KR) .................... 10-2023-0067625

(51) Int. Cl.
*H10F 39/00* (2025.01)
*H04N 25/585* (2023.01)
*H04N 25/77* (2023.01)
*H04N 25/771* (2023.01)
*H04N 25/78* (2023.01)
*H10F 39/18* (2025.01)

(52) U.S. Cl.
CPC ....... *H10F 39/8037* (2025.01); *H04N 25/585* (2023.01); *H04N 25/77* (2023.01); *H04N 25/771* (2023.01); *H04N 25/78* (2023.01); *H10F 39/18* (2025.01); *H10F 39/811* (2025.01)

(58) Field of Classification Search
CPC .... H10F 39/8037; H10F 39/18; H10F 39/811; H10F 39/813; H04N 25/585; H04N 25/77; H04N 25/771; H04N 25/78; H04N 25/778

See application file for complete search history.

(56) References Cited

U.S. PATENT DOCUMENTS

| 9,185,273 | B2 | 11/2015 | Beck et al. |
| 10,411,063 | B2 | 9/2019 | Yang et al. |
| 10,819,931 | B2 | 10/2020 | Goden et al. |
| 11,233,958 | B2 | 1/2022 | Satou et al. |
| 11,350,044 | B2 | 5/2022 | Mori et al. |
| 2019/0238767 | A1* | 8/2019 | Satou .............. H10F 39/18 |

(Continued)

FOREIGN PATENT DOCUMENTS

| JP | 2022-25515 A | 2/2022 |
| KR | 10-2022-0098587 A | 7/2022 |

(Continued)

*Primary Examiner* — Albert H Cutler
(74) *Attorney, Agent, or Firm* — Sughrue Mion, PLLC

(57) ABSTRACT

Provided is a pixel including a first photodiode, a second photodiode having a smaller light receiving area than the first photodiode, a storage capacitor configured to store charges generated by the second photodiode, and a plurality of floating nodes. The pixel according to the present disclosure includes first and second control transistors for transmitting a first voltage or a second voltage to a first node of the storage capacitor in a reset period and an exposure period, and for floating the first node by controlling the first and second control transistors in a readout period.

20 Claims, 10 Drawing Sheets

(56) References Cited

U.S. PATENT DOCUMENTS

| | | | |
|---|---|---|---|
| 2021/0144319 A1* | 5/2021 | Innocent | ............ H10F 39/1865 |
| 2022/0217291 A1 | 7/2022 | Kim et al. | |
| 2022/0272289 A1 | 8/2022 | Oh et al. | |
| 2022/0408039 A1 | 12/2022 | Park et al. | |

FOREIGN PATENT DOCUMENTS

| | | |
|---|---|---|
| KR | 10-2022-0120049 A | 8/2022 |
| KR | 10-2022-0169822 A | 12/2022 |

\* cited by examiner

PIXEL, IMAGE SENSOR AND OPERATING METHOD OF PIXEL

CROSS-REFERENCE TO RELATED APPLICATION

This application claims priority from Korean Patent Application No. 10-2023-0055399 filed on Apr. 27, 2023, and Korean Patent Application No. 10-2023-0067625 filed on May 25, 2023, in the Korean Intellectual Property Office, the contents of which are incorporated by reference herein in its entirety.

BACKGROUND

1. Field

The present disclosure relates to a pixel, an image sensor, and an operating method of the pixel, and more particularly, to a pixel including two photodiodes having different sensitivities and a storage capacitor, an image sensor, and an operating method of the pixel.

2. Description of Related Art

An image sensor generates an image of an object by using a photoelectric conversion element that reacts according to an intensity of light reflected from the object. With the recent development of complementary metal-oxide semiconductor (CMOS) technology, CMOS image sensors using CMOS are widely used. In order to increase a dynamic range of an image sensor, a technology for securing an image signal using different conversion gains of a pixel including photoelectric conversion elements having different sensitivities and a storage capacitor is being recently developed.

SUMMARY

Embodiments of the present disclosure provide a pixel and an operating method of the pixel for securing an image signal having a high dynamic range (HDR) and an improved signal-to-noise ratio (SNR).

Further, embodiments of the present disclosure provide a pixel and an operating method of the pixel capable of removing a shading phenomenon by minimizing a voltage difference according to a pixel position in a pixel array while securing a HDR and an improved SNR.

The pixel according to one or more embodiments of the present disclosure may secure the improved SNR while securing the HDR using output signals in different conversion gain states using photodiodes and having different sensitivities and a storage capacitor.

The image sensor according to one or more embodiments of the present disclosure may improve power supply rejection ratio (PSRR) by appropriately using a voltage generated from a voltage generator and an external power supply voltage in a reset period, an exposure period, and a readout period of a pixel.

The image sensor according to one or more embodiments of the present disclosure may minimize an image shading phenomenon by allocating conductive lines to voltages required for pixels, respectively, and minimizing a voltage difference for each pixel position through a control transistor inside the pixel.

According to an aspect of an example embodiment, there is provided a pixel including: a first photodiode; a first floating node; a first transmission transistor positioned between the first photodiode and the first floating node and configured to transmit first charges generated by the first photodiode to the first floating node based on a first transmission control signal; a second photodiode; a second floating node; a second transmission transistor positioned between the second photodiode and the second floating node and configured to transmit second charges generated by the second photodiode to the second floating node based on a second transmission control signal; a storage capacitor including a first node connected to the second floating node; a first capacitor control transistor configured to transmit a first voltage to a second node of the storage capacitor based on a first capacitor control signal; a second capacitor control transistor configured to transmit a second voltage to the second node of the storage capacitor based on a second capacitor control signal; a connection transistor configured to connect the second floating node and a third floating node; a conversion gain control transistor configured to connect the third floating node and the first floating node; a reset transistor configured to transmit the second voltage to the third floating node; and a read circuit configured to output a pixel output signal to a column line based on a voltage of the first floating node.

According to an aspect of an example embodiment, there is provided an image sensor including: an upper chip including: a pixel area including a plurality of pixels arranged in a plurality of rows and columns, a guard ring area surrounding the pixel area, a through via area, and a pad area including a power pad; and a lower chip including a driving driver configured to provide control signals to the plurality of pixels and a first voltage generator, wherein a first pixel of the plurality of pixels includes: a first photodiode; a first floating node; a first transmission transistor configured to connect the first photodiode and the first floating node; a second photodiode; a second floating node; a second transmission transistor configured to connect the second photodiode and the second floating node; a storage capacitor having a first end connected to the second floating node; a first capacitor control transistor configured to transmit a first voltage generated by the first voltage generator to a second end of the storage capacitor; a second capacitor control transistor configured to transmit a second voltage to the second end of the storage capacitor; a connection transistor configured to connect the second floating node and a third floating node; a conversion gain control transistor configured to connect the third floating node and the first floating node; a reset transistor configured to transmit the second voltage to the third floating node; and a read circuit configured to output a pixel output signal to a column line in response to a voltage of the first floating node; wherein the upper chip further includes first conductive lines for transmitting the first voltage and second conductive lines for transmitting the second voltage, the first conductive lines and the second conductive lines are disposed above the pixel area in units of rows, the first conductive lines are connected to each other in the guard ring area, and the first conductive lines are configured to receive the first voltage from the lower chip through a first through via of the through via area.

According to an aspect of an example embodiment, there is provided an operating method of a pixel including a first photodiode, a second photodiode having a smaller light receiving area than the first photodiode, a storage capacitor configured to store second charges generated by the second photodiode, and a plurality of floating nodes, the operating method including: turning on a first capacitor control transistor to apply a first voltage to a first node of the storage capacitor and resetting the first photodiode, the second photodiode, the plurality of floating nodes, and the storage capacitor using the first voltage; after the resetting, an exposure operation of turning off the first capacitor control transistor and turning on a second capacitor control transistor to apply a second voltage to the first node of the storage capacitor and generating cumulative charges based on light received from the first photodiode and the second photodiode; after the exposure operation, turning off the first capacitor control transistor and the second capacitor control transistor, floating the first node of the storage capacitor, and generating a first output signal based on the second charges generated by the second photodiode; and after the generating the first output signal, turning off the first capacitor control transistor and turning on the second capacitor control transistor to apply the second voltage to the first node of the storage capacitor and outputting a second output signal in response to the second charges stored in the storage capacitor and generated by the second photodiode.

According to an aspect of an example embodiment, there is provided an operating method of a pixel including a first photodiode, a second photodiode having a smaller light receiving area than the first photodiode, a storage capacitor configured to store second charges generated by the second photodiode, and a plurality of floating nodes, the operating method including: turning on a first capacitor control transistor to apply a first voltage to a first node of the storage capacitor and resetting the first photodiode and the second photodiode, the plurality of floating nodes, and the storage capacitor using the first voltage; after the resetting, an exposure operation of turning off the first capacitor control transistor and turning on a second capacitor control transistor to apply a second voltage to the first node of the storage capacitor and turning on a control transistor to generate cumulative charges by the first photodiode and the second photodiode while removing first charges that are generated by the first photodiode and overflowed through a third voltage; turning off the first capacitor control transistor and the second capacitor control transistor, floating the first node of the storage capacitor, and outputting a first output signal in response to the second charges generated by the second photodiode; and turning on the second capacitor control transistor, turning off the first capacitor control transistor, and outputting a second output signal in response to the second charges generated by the second photodiode.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Hereinafter, example embodiments of the present disclosure will be described in detail with reference to the accompanying drawings.

Figure 1:
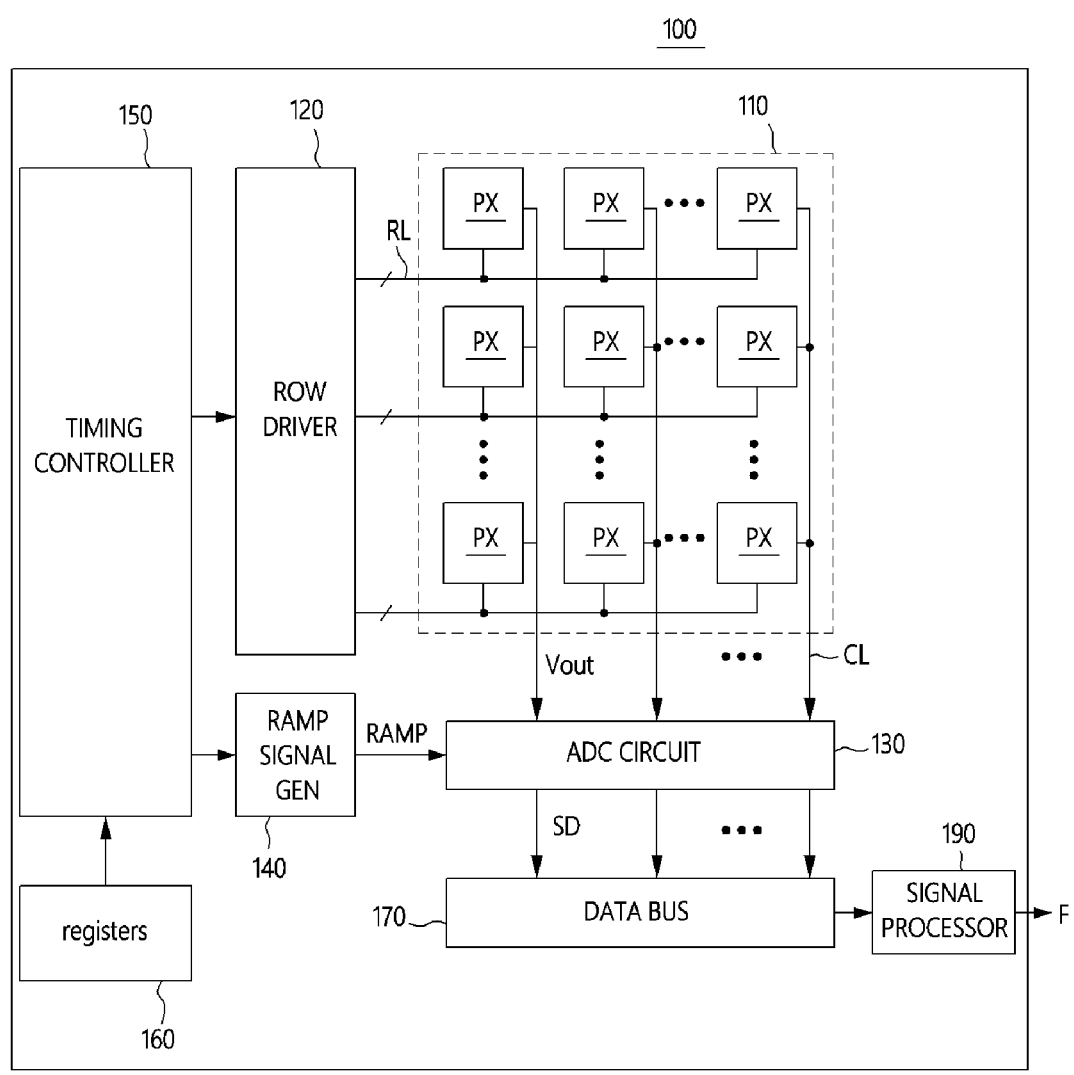
FIG. 1 is a block diagram illustrating an image sensor according to an example embodiment of the present disclosure.

FIG. 1 is a block diagram illustrating an image sensor according to an example embodiment of the present disclosure.

An image sensor 100 may be mounted on an electronic device having a light sensing function. For example, the image sensor 100 may be mounted on electronic devices such as a camera, a smartphone, a wearable device, Internet of Things (IoT) device, a home appliance, a tablet personal computer (PC), a personal digital assistant (PDA), a portable multimedia player (PMP), navigation, drone, advanced drivers assistance system (ADAS), and the like. In addition, the image sensor 100 may be mounted on electronic devices provided as parts, such as vehicles, furniture, manufacturing facilities, doors, and various measuring devices.

Referring to FIG. 1, the image sensor 100 may include a pixel array 110, a row driver 120, an ADC block 130, a ramp signal generator 140, a timing controller 150, a setting register 160, a data bus 170, and a signal processor 190.

Figure 3:
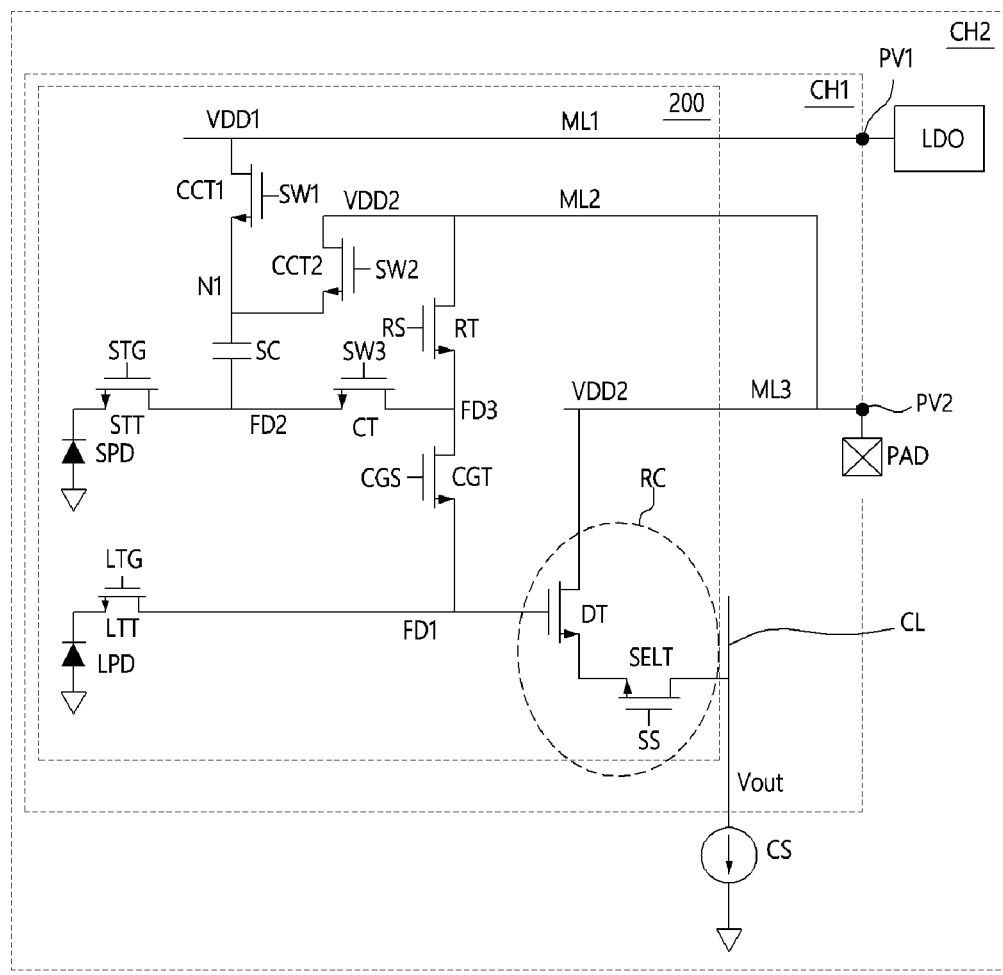
FIG. 3 illustrates connections between a pixel circuit and voltage supply lines connected to the pixel according to an example embodiment of the present disclosure.

The pixel array 110 includes a plurality of pixels PX connected to a plurality of row lines RL and a plurality of column lines CL and arranged in rows and columns. Each of the plurality of row lines RL may be connected to pixels PX disposed in the same row. For example, the plurality of row lines RL may transmit control signals output from the row driver 120 to each of the transistors constituting the pixel as illustrated in FIG. 3.

Each of the plurality of pixels PX according to an example embodiment of the present disclosure may include at least one photodiode that is a photoelectric conversion element. A microlens for condensing light may be disposed above each of the plurality of pixels PX or above pixel groups including adjacent pixels PX. Each photodiode may detect light received through the microlens and a color filter to generate charge, and each pixel may generate an electrical signal in response thereto.

The pixel PX according to an example embodiment of the present disclosure may include a first photodiode LPD (hereinafter, referred to as LPD) having a large light receiving area and a second photodiode SPD (hereinafter, referred to as SPD) having a smaller light receiving area than the first photodiode LPD. The light receiving area of LPD is more than twice as large as that of SPD. Each pixel may include one or more floating nodes and a plurality of transistors for converting charges generated by the first photodiode LPD and the second photodiode SPD, respectively, into electrical signals in response to the received light. A conversion gain may be varied according to a capacitance of the floating node. As the capacitance increases, the conversion gain decreases, and as the capacitance decreases, the conversion gain increases. Using a conversion gain transistor, the charges generated by the first photodiode LPD are output as sub-pixel output signals in a high conversion gain state and a low conversion gain state, respectively. The charges generated during an exposure time in the second photodiode SPD may be stored in the storage capacitor. Using a capacitance of the floating node and a capacitance of the storage capacitor, the charges generated by the second photodiode SPD are output as sub-pixel output signals in a high conversion gain state and a low conversion gain state.

That is, the pixel may sequentially output the sub-pixel output signals obtained by converting the charges generated by the first photodiode LPD with different conversion gains, and the sub-pixel output signals obtained by converting the charges generated by the second photodiode SPD with different conversion gains after a single exposure period.

For example, the sub-pixel signals include a first sub-pixel signal obtained by converting the charges generated by the first photodiode LPD with a high conversion gain (HCG), and a second sub-pixel signal obtained by converting the charges generated by the first photodiode LPD with a low conversion gain (LCG). In addition, the sub-pixel signals include a third sub-pixel signal obtained by converting the charges generated by the second photodiode SPD with a high conversion gain (HCG), and a fourth sub-pixel signal obtained by converting the charges generated by the second photodiode SPD with a low conversion gain (LCG). The image sensor 100 may generate an image signal using the first to fourth sub-pixel signals in order of illumination from lowest to highest.

The row driver 120 may drive the pixel array 110 in units of rows. The row driver 120 may decode a signal (e.g., an address signal) received from the timing controller 150 and select at least one row of the pixel array 110 in response to the decoded signal. The row driver 120 may transmit control signals for generating a pixel output signal Vout from pixels connected to the selected row to the pixel array 110 through a column line.

The row driver 120 may provide the control signals to the pixel array 110 as a high or low voltage level according to the reset period, the exposure period, and the readout period. The pixels connected to the selected row may sequentially output the first to fourth sub-pixel signals to corresponding column lines in the readout period in response to the control signals. The control signals output from the row driver 120 and a detailed operation description of the pixel PX operating in response thereto will be described in detail with reference to FIGS. 3 and 5.

The setting register 160 stores operation mode information of the image sensor 100. Outside of the image sensor 100, an application processor AP may set an operation mode of the image sensor 100 in the setting register 160 through an interface. The information of the setting register may be changed by the application processor AP in a frame unit, which is a unit in which the image sensor 100 outputs image data to the application processor AP.

The timing controller 150 may control overall operations of the row driver 120, the ramp signal generator 140, the ADC block 130, and the signal processor 190 of the image sensor 100 according to the operation mode set in the setting register 160.

The ramp signal generator 140 may generate a ramp voltage signal RAMP that increases or decreases with a predetermined slope and provide the ramp voltage signal RAMP to the ADC block 130.

The ADC block 130 may receive a pixel output signal Vout from the pixels PX connected to at least one row selected by the row driver 120 among the plurality of pixels PX through the column lines CL. The pixel output signal Vout includes the first to fourth sub-pixel signals and sub-reset signals corresponding to each of the first to fourth sub-pixel signals.

The ADC block 130 may include a plurality of ADC circuits corresponding to the plurality of column lines CL, and each ADC circuit may compare the sub-pixel output signal and the corresponding sub-reset signal with the ramp signal RAMP, and convert a change time of a comparison signal according to the comparison result into a digital value to generate sub-digital signals SD.

Each ADC circuit may generate the sub-digital signals through correlated double sampling (CDS). The correlated double sample (CDS) may be classified into a first CDS (1st CDS) that receives and processes a signal level of the floating node after receiving a reset level of the floating node of the pixel and a second CDS (2nd CDS) that receives and processes the reset level after receiving the signal level of the floating node of the pixel.

The data bus 170 sequentially receives the sub-digital signals SD from the ADC block 130. The data bus 170 may include a memory for temporarily storing the received sub-digital signals SD and a memory controller for aligning the stored sub-digital signals SD into data required by the signal processor 190 and then outputting the data. The sub-digital signals SD stored in the memory may be output to the signal processor 190 under the control of the memory controller.

The signal processor 190 may receive and process the aligned sub-digital signals from the data bus 170 to generate a final digital image signal F. The signal processor 190 may select an appropriate non-saturated signal from among the sub-digital signals or generate a digital image signal using two or more sub-digital signals. The signal processor 190 may further perform signal processing such as noise reduction processing, gain adjustment, waveform shaping processing, interpolation processing, white balance processing, gamma processing, edge emphasis processing, or binning on the generated digital image signal, and then cause the application processor to generate the final digital image signal F. Meanwhile, according to an example embodiment, some of the signal processing functions of the signal processor 190 may also be provided in an external processor of the image sensor 100.

Figure 2:
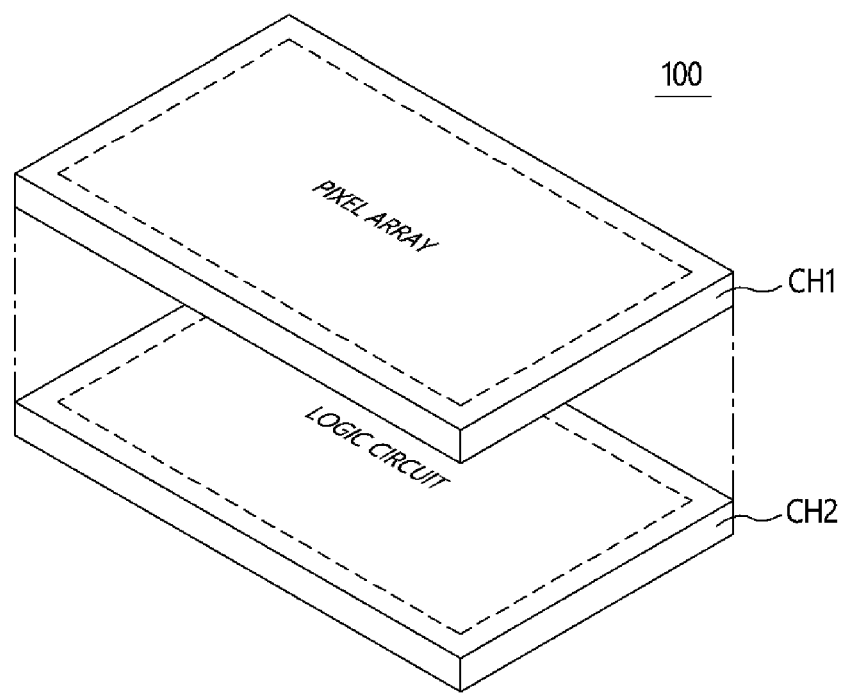
FIG. 2 is a conceptual configuration diagram of an image sensor having a stacked structure according to an example embodiment of the present disclosure.

FIG. 2 is a conceptual configuration diagram of an image sensor having a stacked structure according to an example embodiment of the present disclosure.

Referring to FIGS. 1 and 2 together, the image sensor 100 may include an upper chip CH1 including the pixel array 110 and a lower chip CH2 including the elements 120 to 190 excluding the pixel array 110. The upper chip CH1 and the lower chip CH2 may be stacked on each other and may transmit signals to each other through a through silicon via TSV or other connection means penetrating through the upper chip CH1.

As another example of the present disclosure, the image sensor 100 may include three upper/middle/lower chips that are vertically stacked. In this case, the pixel array 110 may be divided into an upper first chip and a middle second chip. That is, photodiodes constituting a pixel may be formed in the upper first chip and transistors aligned with each of the upper photodiodes may be formed in the middle second chip to constitute the pixel array. The elements 120 to 190 excluding the pixel array 110 may be formed in a lower third chip.

Figure 4:
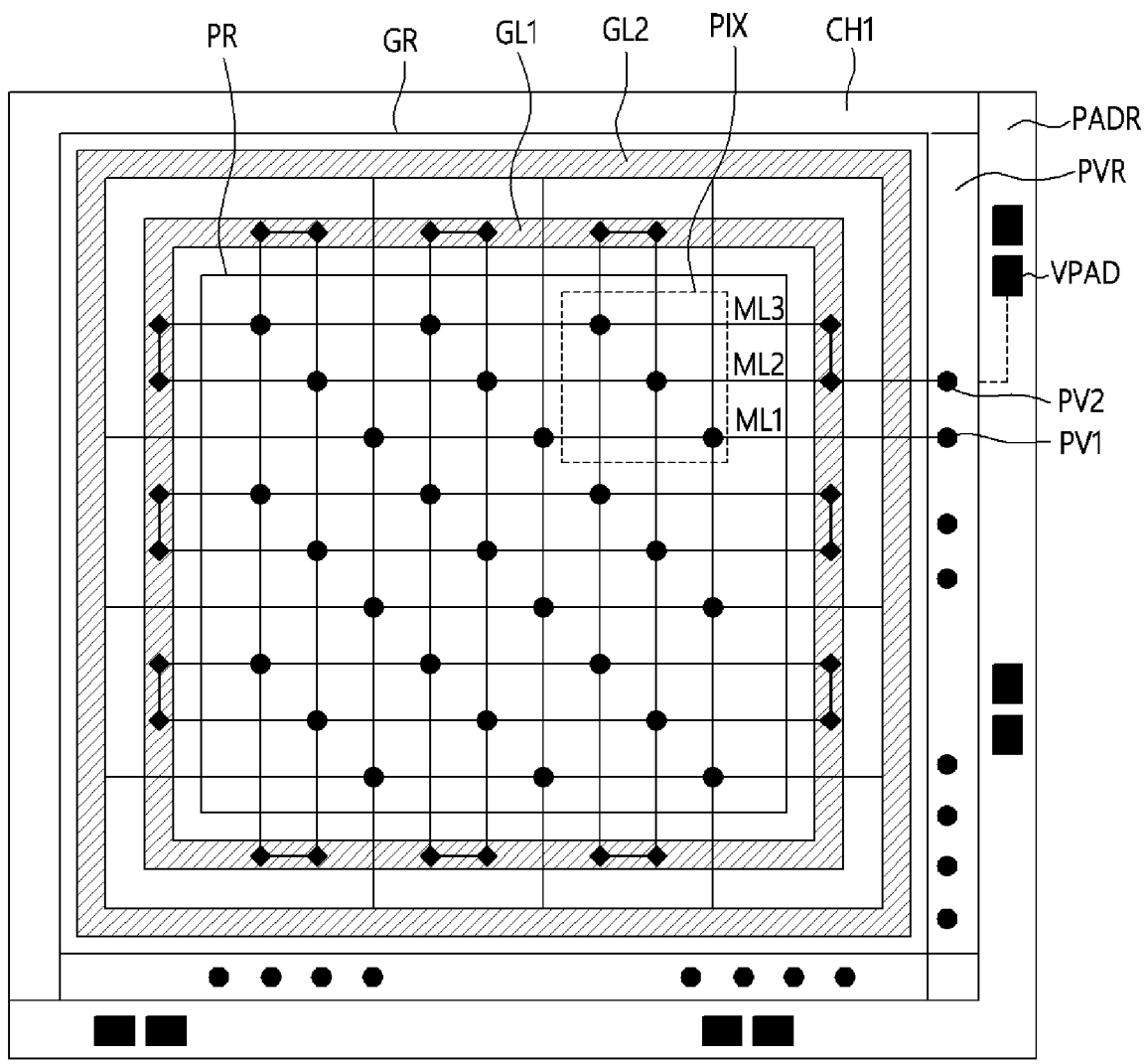
FIG. 4 is a plan view of an upper chip of an image sensor including a pixel array constituted by the pixels of FIG. 3.

FIG. 3 illustrates connections between a pixel circuit and voltage supply lines connected to the pixel according to an example embodiment of the present disclosure. FIG. 4 is a plan view of an upper chip of an image sensor including a pixel array constituted by the pixels of FIG. 3.

Referring to FIGS. 3 and 4 together, a pixel 200 is included in a pixel area of the pixel array of the upper chip CH1. The pixel 200 may include a first photodiode LPD, a second photodiode SPD, a storage capacitor SC, two or more floating nodes FD1, FD2, and FD3, a plurality of transistors, and a read circuit RC.

The pixel 200 receives a first voltage VDD1 through a first conductive line ML1 and receives a second voltage VDD2 through a second conductive line ML2 and a third conductive line ML3. The first voltage VDD1 may be a voltage generated by a voltage generator LDO positioned in the lower chip CH2 of the image sensor 100 and transmitted to the upper chip CH1 through a through-via PV1. The second voltage VDD2 is a voltage supplied from the outside of the image sensor 100 through a power pad PAD, and is transmitted from the lower chip CH2 to the upper chip CH1 through a through-via PV2. The second voltage VDD2 may be transmitted to the pixel through the second conductive line ML2 and the third conductive line ML3 in the pixel area. The voltage generator LDO may include a low dropout LDO generating the first voltage VDD1 using the second voltage VDD2 or another voltage. The second voltage VDD2 may also be supplied to other elements of the upper chip CH1 or the lower chip CH2. The first voltage VDD1 may be a smaller voltage than the second voltage VDD2.

The first photodiode LPD is connected to a first floating node FD1 through a first transmission control transistor LTT. The second photodiode SPD is connected to a second floating node FD2 through a second transmission control transistor STT. The first photodiode LPD may have a relatively larger light receiving area than the second photodiode SPD. Under the same light receiving conditions, the first photodiode LPD may generate more charges than the second photodiode SPD. That is, the first photodiode LPD may have a higher sensitivity than the second photodiode SPD and may generate a pixel output signal Vout effective in low illumination. In contrast, the second photodiode SPD may generate a pixel output signal Vout effective in high illumination.

Charges generated by each photodiode during the exposure period may be transmitted to the floating nodes FD1 and FD2 through the transmission transistors LTT and STT in response to the first and second transmission control signals LTG and STG. In addition, charges exceeding full well capacity (FWC) of each photodiode may overflow through the respective transmission transistors LTT and STT regardless of the transmission control signals LTG and STG.

A first terminal of the storage capacitor SC is connected to the second floating node FD2, and a second terminal thereof is commonly connected to a first capacitor control transistor CCT1 (hereinafter, referred to as CCT1) and a second capacitor control transistor CCT2 (hereinafter, referred to as CCT2) through a node N1. One end of CCT1 is connected to N1 and the other end thereof is connected to the first voltage VDD1. The first voltage VDD1 is transmitted through the first conductive line ML1. The CCT1 may transmit the first voltage VDD1 to the second terminal of the storage capacitor SC through the node N1 in response to a first capacitor switch signal SW1 (hereinafter, referred to as SW1). One end of CCT2 is connected to the node N1 of the storage capacitor SC and the other end thereof is connected to the second voltage VDD2. The second voltage VDD2 is transmitted through the second conductive line ML2. The CCT2 may transmit the second voltage VDD2 to the second terminal of the storage capacitor SC through the node N1 in response to a second capacitor switch signal SW2 (hereinafter, referred to as SW2). That is, the node N1 connected to the second terminal of the storage capacitor SC may be connected to the first voltage VDD1 or the second voltage VDD2 or be in a floating state according to the first capacitor switch signal SW1 and second capacitor switch signal SW2.

In the reset period of the pixel, the second voltage VDD2 may be transmitted to the second terminal of the storage capacitor SC, and in the exposure period thereof, the first voltage VDD1 may be transmitted thereto. In a HCG readout period of the second photodiode SPD, the node N1 is floated, and in a LCG readout period of the second photodiode SPD, the VDD2 is transmitted to the node N1. The voltage applied to the node N1 connected to the second terminal of the storage capacitor according to the operation period of the pixel will be described later in detail with reference to FIG. 5.

The capacitance of the storage capacitor may be 200 times larger than the capacitance of the first to third floating nodes FD1, FD2, and FD3 included in the pixel. In order to secure a sufficient capacitance of the storage capacitor, the storage capacitor may be formed in a metal-insulator-metal (MIM) plate shape or a cylinder shape like a DRAM capacitor.

The plurality of transistors may include a connection transistor CT, a reset transistor RT, and a conversion gain transistor CGT (hereinafter, referred to as CGT). The connection transistor CT may be positioned between the second floating node FD2 and the third floating node FD3, and may electrically connect the second floating node FD2 and the third floating node FD3 to each other according to a connection control signal SW3.

The reset transistor RT transmits the second voltage VDD2 to the third floating node FD3 in response to a reset control signal RS.

The conversion gain transistor CGT may electrically connect the third floating node FD3 and the first floating node FD1 to each other in response to a conversion control signal CGS.

In the reset period of the pixel, in a stage in which the reset transistor RT and the conversion gain transistor CGT are turned on, when the first transfer transistor LTT is turned on, the first photodiode LPD is reset, and when the connection transistor CT, CCT2, and the second transmission transistor STT are turned on, the storage capacitor SC and the second photodiode SPD are reset. When the conversion gain transistor CGT is turned off in the first photodiode LPD read period, a high conversion gain HCG state is obtained, and when the conversion gain transistor CGT is turned on, a low conversion gain LCG state is obtained.

The read circuit RC includes a driving transistor DT and a selection transistor SELT connected in series between the column line CL and the second voltage VDD2. The second voltage VDD2 is transmitted through the third conductive line ML3. The driving transistor DT may output the pixel output signal Vout to the column line CL through the selection transistor SELT based on a bias current generated by a current source CS connected to the column line CL in response to the voltage corresponding to the charges transmitted to the first floating node FD1.

The pixel output signal Vout output from the pixel 200 may include sub-output signals obtained by converting the charges generated by the first photodiode LPD with the HCG and the LCG, and sub-output signals obtained by converting the charges generated by the second photodiode SPD with the HCG and the LCG.

Thus, a problem is solved by embodiments using the signal SW2 provided to CCT2 to reset the charge on the capacitor SC (see FIG. 3).

Referring to FIG. 4, the upper chip CH1 includes a pixel area PR including the pixels PIX, a guard ring area GR, a through via area PVR, and a pad area PADR.

The pixel area PR includes a pixel array in which the pixels 200 of FIG. 3 are arranged in rows and columns, and on the pixel area PR, conductive lines for transmitting control signals connected to the transistors of the pixels in a row unit and the first to third conductive lines ML1 to ML3 for supplying the voltage to the pixels are formed. The first conductive line ML1 transmits the first voltage VDD1, and the second and third conductive lines ML2 and ML3 transmit the second voltage VDD2. The first to third conductive lines ML1 to ML3 are formed to be separated from each other in the pixel area and are disposed in a mesh shape.

The guard ring area GR surrounds the pixel area PR and includes a first guard ring line GL1 connecting the second conductive line ML2 and the third conductive line ML3 and a second guard ring line GL2 connecting the first conductive lines ML1. The second voltage VDD2 transmitted to the second conductive line ML2 and the second voltage VDD2 transmitted to the third conductive line ML3 may maintain a uniform distribution by the first guard ring line GL1. The second conductive line ML2 and the third conductive line ML3 may not be connected in the pixel area PR and may be connected only in the guard ring area GR. By separating the second conductive line ML2 and the third conductive line ML3 in the pixel area PR, it is possible to prevent image shading deterioration that may occur depending on a position of the pixel in the pixel reset period or readout period.

The through via area PVR includes through vias PV that penetrate through the upper chip CH1 and are connected to the lower chip CH2. The control signals transmitted from the row driver 120 positioned in the lower chip CH2 are transmitted to the pixel through conductive lines in the upper chip CH1 through some of the through vias. The first voltage VDD1 generated by the voltage generator LDO positioned in the lower chip CH2 is transmitted to the first conductive line ML1 through at least one (e.g., PV1) of the through-vias. The second voltage VDD2 supplied from the outside through the pad of the image sensor and transmitted from the lower chip CH2 is transmitted to the second and third conductive lines ML2 and ML3 through at least the other PV2 of the through vias.

The pad area PADR includes a plurality of pads. The image sensor interfaces with the outside through the plurality of pads. The plurality of pads include at least one or more power supply voltage pads VPAD to which a voltage supplied from the outside is applied. The second voltage VDD2 may be transmitted from the outside to the second and third conductive lines ML2 and ML3 through at least one power supply voltage pad VPAD and through via PV2.

Figure 5:
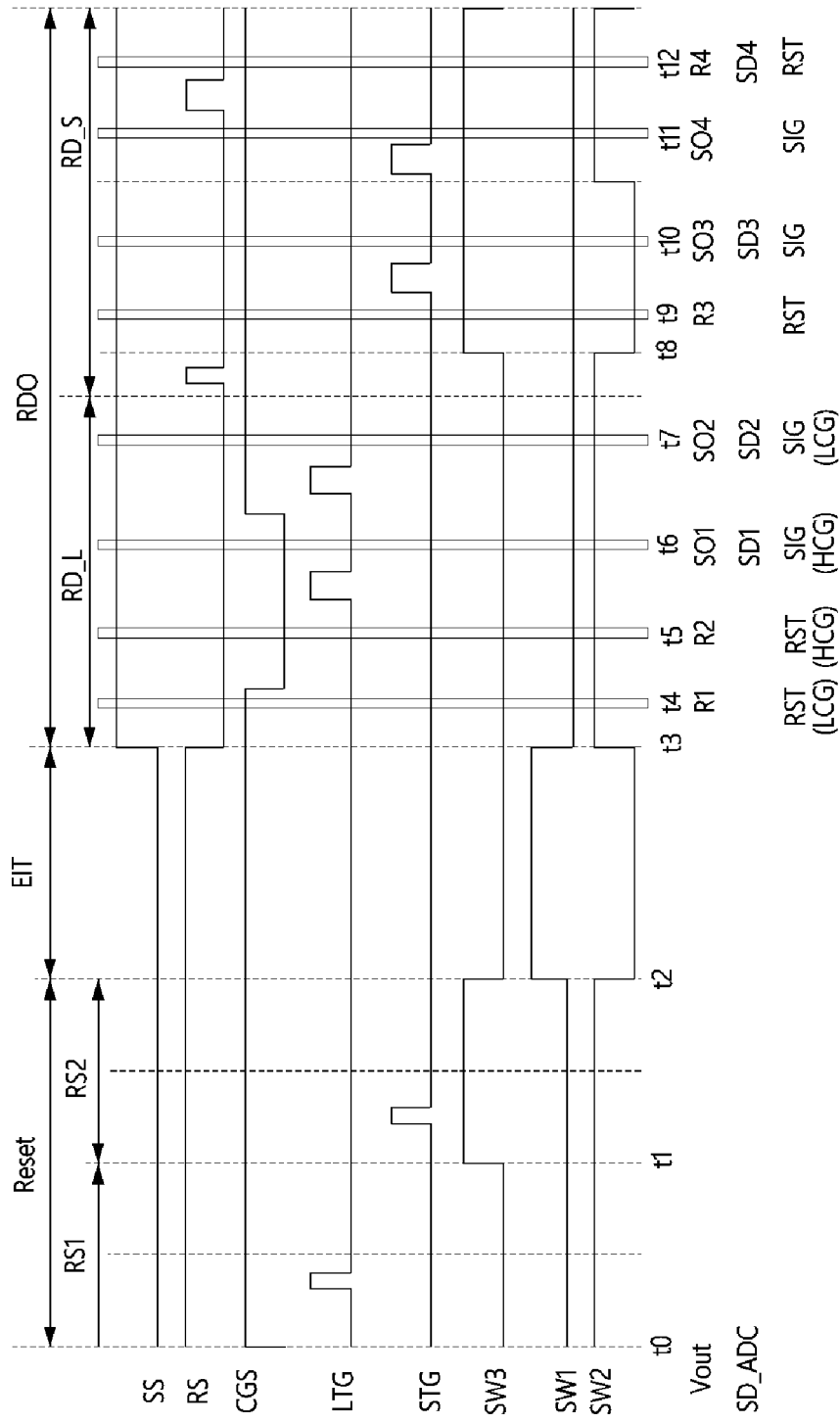
FIG. 5 is an operation timing diagram of the pixel of FIG. 3 according to an example embodiment of the present disclosure.

FIG. 5 is an operation timing diagram of the pixel of FIG. 3 according to an example embodiment of the present disclosure.

In the timing diagram of FIG. 5, as control signals applied to gates of the transistors of the pixel, waveforms of a selection control signal SS (hereinafter, referred to as SS), a reset control signal RS (hereinafter, referred to as RS), a conversion control signal CGS (hereinafter, referred to as CGS), a first transmission control signal LTG (hereinafter, referred to as LTG), a second transmission control signal STG (hereinafter, referred to as STG), a connection control signal SW3, and capacitor connection control signals SW1 and SW2 (hereinafter, referred to as SW1 and SW2, respectively) are sequentially illustrated. The control signals may be generated in the form of pulses in the row driver 120 under the control of the timing controller 150. Each of the pulse waveforms toggles between a high level voltage and a low level voltage. The high level voltage turns the transistor on, and the low level voltage turns the transistor off. However, according to various example embodiments, when some of the transistors constituting the pixel of FIG. 3 are configured as PMOS, the pulse waveform may be driven in a manner opposite to that of FIG. 5.

The timing diagram of FIG. 5 illustrates the control signals, a pixel output signal Vout output through the column line of the pixel, and a sub-digital signal SD_ADC output after performing the CDS on the pixel output signals in the ADC block.

Hereinafter, an operation period of the pixel will be described in detail with reference to FIGS. 3 and 5. The operation period of the pixel may sequentially include a reset period Reset, an exposure period EIT, and a readout period RDO.

The reset period Reset (t0 to t2) is a period for resetting the first to third floating nodes FD1 to FD3, the storage capacitor SC, the first photodiode LPD, and the second photodiode SPD. The reset period includes a first reset period RS1 and a second reset period RS2, and during the reset period, the row driver 120 maintains the SS at a low level and the RS and the conversion control signal CGS at a high level. The first capacitor switch signal SW1 turns off the CCT1 at a low level and the second capacitor switch signal SW2 turns on the CCT2 at a high level to transmit the second voltage VDD2 of the second conductive line ML2 to the node N1.

In the first reset period RS1, in a state in which the floating node FD1 and the floating node FD3 are connected, the LTG is toggled and the floating node FD1, the floating node FD3, and the first photodiode LPD are reset using the second voltage VDD2. In the second reset period RS2, after setting the SW3 to a high level and connecting the second floating node FD2 and the third floating node FD3, the STG is toggled and the floating node FD1, the floating node FD2, the floating node FD3, the storage capacitor sc, and the second photodiode SPD are reset using the second voltage VDD2. The storage capacitor SC may be reset by the second voltage VDD2 transmitted to the second conductive line ML2 and the second voltage VDD2 transmitted to the third conductive line ML3.

The exposure period EIT (t2 to t3) is a period in which the first photodiode LPD and the second photodiode SPD generate charges by the received light. During the exposure period, the SS is maintained at a low level, the RS and the conversion control signal CGS are maintained at a high level, and the LTG, the STG, and the SW3 are maintained at a low level. The second capacitor switch signal SW2 turns off the CCT2 at a low level, and the first capacitor switch signal SW1 maintains a high level to turn on the CCT1 and transmits the first voltage VDD1 to the node N1.

When the charges generated by the first photodiode LPD exceed a full well capacity FWC of the first photodiode LPD, the charges may overflow through the LTT and be drained to the second voltage VDD2 of the second conductive line ML2 through the conversion gain transistor CGT and the RT. When the charges generated by the second photodiode SPD exceed the full well capacity FWC of the second photodiode SPD, the charges may overflow through the STT and be accumulated in the second floating node FD2 and the storage capacitor SC.

Leakage of charges overflowing from the second photodiode SPD to the second floating node FD2 during the exposure period may be suppressed by lowering the voltage of second floating node FD2 connected to the first terminal of the storage capacitor because the first voltage VDD1 having a smaller voltage than the second voltage VDD2 is applied to the node N1.

If the first conductive line ML1 transmitting the first voltage VDD1 and the second conductive line ML2 transmitting the second voltage VDD2 are one conductive line that is not separated from each other, the driver positioned in the lower chip CH2 in units of selected rows needs to drive the second voltage VDD2 to one conductive line in the reset period and needs to drive the first voltage VDD1 to one conductive line in the exposure period. Therefore, depending on the position of the pixel in the pixel array, a voltage drop may occur due to a resistance component of the conductive line, resulting in a shading phenomenon of the image signal.

In contrast, in the present disclosure, the voltages required for the reset period and the exposure period are transmitted using the capacitor control transistors CCT1 and CCT2 in the pixel in a state in which the voltages are applied through different conductive lines. Therefore, the shading phenomenon of the image signal may be suppressed by minimizing the voltage change of the conductive line for each pixel position. In addition, the voltage driver of the lower chip CH2 may be removed.

The exposure period EIT may be 11 ms or longer to minimize a flicker phenomenon caused by LEDs used in traffic lights. The reset period or the readout period may be a time period that is about 1,000 times smaller than the exposure period.

The readout period RDO includes an LPD read period RD_L and an SPD read period RD_S sequentially disposed in a state in which the SELT is turned on with the SS at a high level.

The pixel may sequentially output the first reset signal R1, the second reset signal R2, the first output signal SO1, and the second output signal SO2 through the column line during the first photodiode LPD read period RD_L. During the first photodiode LPD read period RD_L, the CCT2 is turned on in response to the second capacitor switch signal SW2 of high level and the second voltage VDD2 is connected to the node N1.

The pixel outputs the first reset signal R1 at time t4 when the conversion gain transistor CGT is turned on, then turns off the conversion gain transistor CGT and outputs the second reset signal R2 at time t5. After the time t5, the LTG is toggled to transmit the charges generated by the first photodiode LPD to the floating node FD1 through the LTT, and then the first output signal SO1 is output at time t6. After the time t6, the conversion gain transistor CGT is turned on to share the charge transmitted to the second floating node FD1 with the third floating node FD3, and then the second output signal SO2 is output at time t7. The second reset signal R2 and the SO1 are signals in a state in which the conversion gain transistor CGT is turned off, that is, in a high conversion gain (HCG) state. The first reset signal R1 and the second output signal SO2 are signals in a state in which the conversion gain transistor CGT is turned on, that is, in a low conversion gain (LCG) state.

The ADC block 130 performs the first CDS using the second reset signal R2 and the SO1 to generate a first sub-digital signal SD1, and performs the first CDS using the first reset signal R1 and the R02 to generate a second sub-digital signal SD2.

After the time t7, that is, after the first photodiode LPD read period RD_L and before the second photodiode SPD read period RD_S, in order to reset the charges generated by the first photodiode LPD and transmitted to the first floating node FD1 and the third floating node FD3, the RS is toggled while maintaining the conversion control signal CGS at a high level.

In the second photodiode SPD read period RD_S (t8 to t12), the third reset signal R3, the third output signal SO3, the fourth output signal SO4, and the fourth reset signal R4 are sequentially output through the column line while maintaining the first capacitor switch signal SW1 at a low level and the SW3 and the conversion control signal CGS at a high level. Since the SW3 and the conversion control signal CGS are maintained at the high level, the capacitances of the floating nodes FD1, FD3, and FD2 are added. At time t8, both CCT1 and CCT2 are turned off by the first capacitor switch signal SW1 of a low level and the second capacitor switch signal SW2 of a low level, and the node N1 is in a floating state, so that the capacitance of the storage capacitor SC is not reflected in the capacitances of the floating nodes. At time t9, the third reset signal R3 reflecting the charge overflowed from the second photodiode SPD is output. After the time t9, the STG is toggled to transmit the charge accumulated in the second photodiode SPD to the floating node, and the third output signal SO3 is then output at time t10. The ADC block 130 performs the first CDS using the third reset signal R3 and the third output signal SO3 and generates a third sub-digital signal SD3.

After the third output signal SO3 is output, the CCT2 is turned on by converting the second capacitor switch signal SW2 to a high level to transmit the second voltage VDD2 to the node N1 connected to the second terminal of the storage capacitor SC, so that the capacitance of SC is added to the capacitance of the floating nodes, thereby increasing the total capacitance. Thereafter, through STG toggling, the charges generated by the second photodiode SPD are transmitted to the second floating node FD2, and the SO4 reflecting the charges generated by the second photodiode SPD is then output at time t11. The STG toggling right before t11, which is an operation to completely transmit the charges generated by SPD to the second floating node FD2, may be omitted. After the time t11 when the SO4 is output, the RS is toggled to reset the floating nodes and the storage capacitor SC to the second voltage VDD2, and then the R4 is output at time t12. The ADC block 130 performs the second CDS using the SO4 and R4 and generates a fourth sub-digital signal SD4.

The pixel outputs the R3 and the SO3 after making the storage capacitor SC a floating state to convert the charges generated by the second photodiode SPD into a signal in a high conversion gain (HCG) state in the second photodiode SPD read period RD_S, and outputs the SO4 and the R4 with the second voltage VDD2 transmitted to the second conductive line through the CCT2 applied to the storage capacitor SC to convert the charge into a signal in a low conversion gain (LCG) state.

According to the present disclosure, even in the reset period, the exposure period, and the second photodiode SPD readout period, since the first voltage VDD1 and the second voltage VDD2 are transmitted to each pixel using the capacitor control transistors CCT1 and CCT2 in the pixel in a state in which the voltages are transmitted through different conductive lines, a shading phenomenon of the image signal may be suppressed by minimizing the voltage change for each pixel position.

Figure 6:
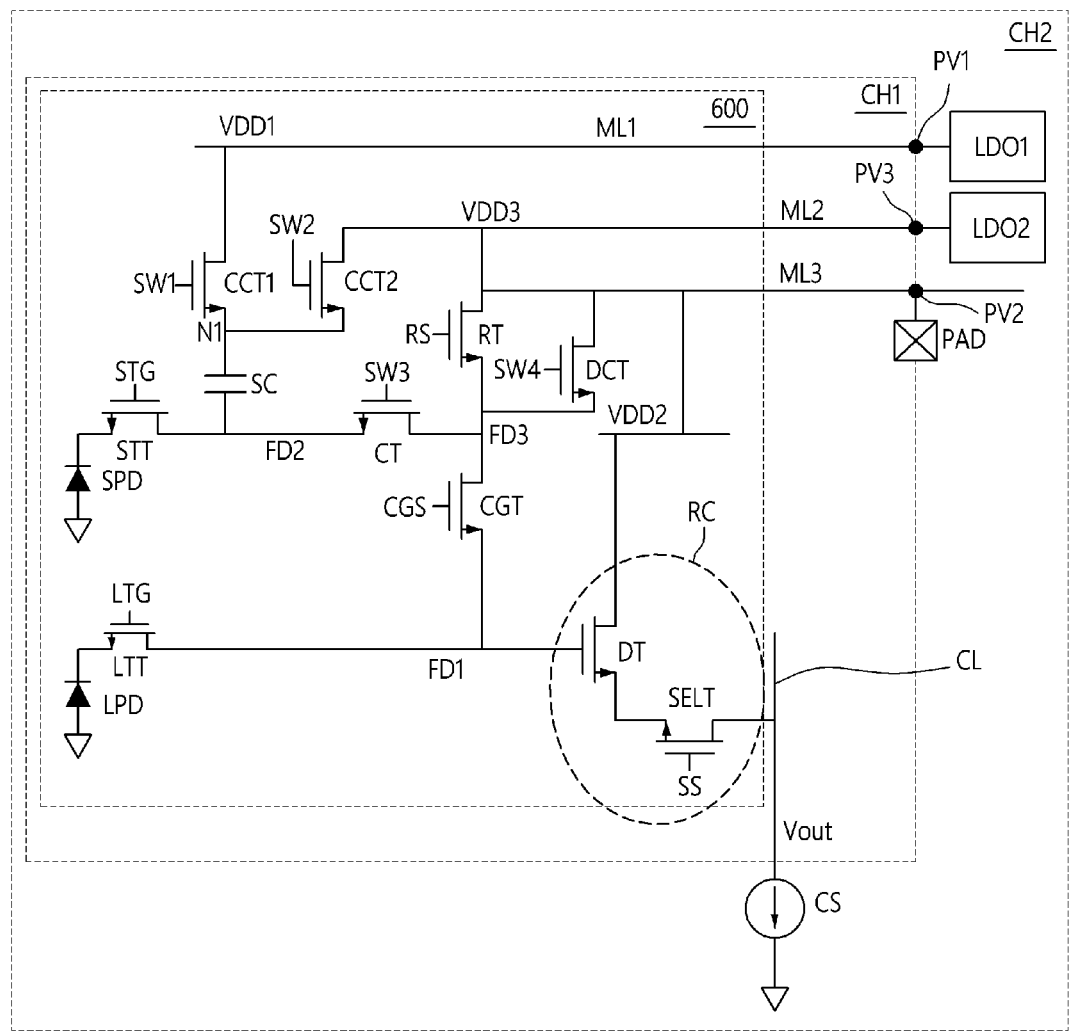
FIG. 6 illustrates connections between a pixel circuit and voltage supply lines connected to the pixel circuit according to another example embodiment of the present disclosure.
Figure 7:
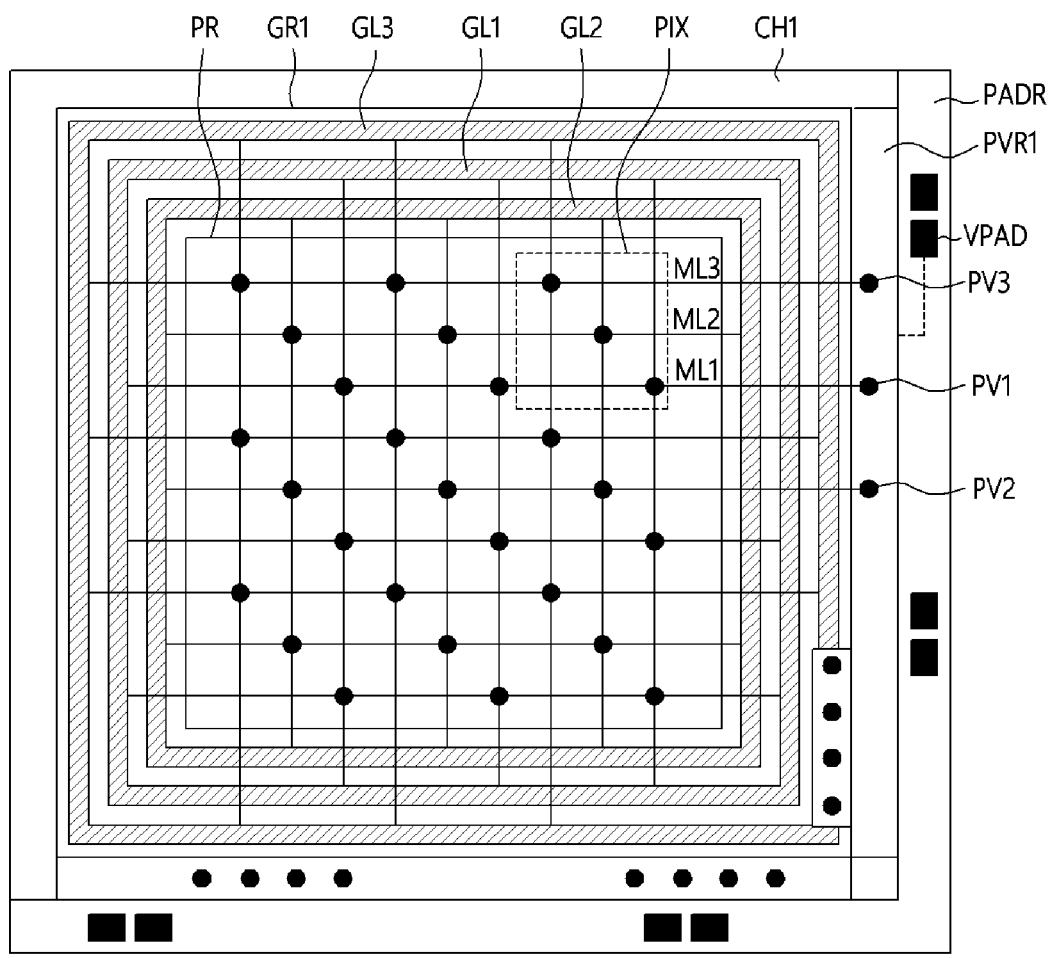
FIG. 7 is a plan view of an upper chip of an image sensor including a pixel array constituted by the pixels of FIG. 6.

FIG. 6 illustrates connections between a pixel circuit and voltage supply lines connected to the pixel circuit according to another example embodiment of the present disclosure. FIG. 7 is a plan view of an upper chip of an image sensor including a pixel array constituted by the pixels of FIG. 6.

Referring to FIGS. 6 and 7 together, a pixel 600 receives the first voltage VDD1 from the first voltage generator LDO1 of the lower chip CH2 through the through via PV1 and the first conductive line ML1, receives the third voltage VDD3 from the second voltage generator LDO2 through the through via PV3 and the second conductive line ML2, and receives the second voltage VDD2 supplied from the outside of the image sensor through the power pad through the through via PV2 and the third conductive line ML3. The lower chip CH2 may include at least two voltage generators LDO1 and LDO2. The first voltage VDD1 may have a level smaller than that of the second voltage VDD2. The second voltage VDD2 may have the same level as the third voltage VDD3. The second voltage VDD2 may also be supplied to other elements of the upper chip CH1 or the lower chip CH2.

The pixel 600 is the same as the pixel 200 of FIG. 3 except that a drain control transistor DCT (hereinafter, referred to as DCT) is added between the second voltage VDD2 and the third floating node FD3, and the third voltage VDD3 is connected to the CCT2 and the reset transistor RT. The DCT is turned on during the exposure period, and may remove the charges generated by the first photodiode LPD and exceeding the FWC through the VDD2, which is a voltage applied from the outside through the conversion gain transistor CGT and the DCT. A detailed operation timing diagram of the pixel 600 will be described later with reference to FIG. 8.

Thus, a problem is solved by embodiments by resetting excessive charge at the diffusion area FD3 using the control signal SW4 applied to the drain transistor DCT. See FIG. 6.

Referring to FIG. 7, the upper chip CH1 of the image sensor has the same structure as that of FIG. 4 except for the guard ring area GR1 and the through via area PVR1. In the guard ring area GR1, the first conductive lines ML1 transmitting the first voltage VDD1 are connected to each other by the first guard ring line GL1. In the guard ring area GR1, the second conductive lines ML2 transmitting the second voltage VDD2 are connected to each other by the second guard ring line GL2. In the guard ring area GR1, the third conductive lines ML3 transmitting the third voltage VDD3 are connected to each other by the third guard ring line GL3. The through via area PVR1 includes a through via PV1 for transmitting the first voltage VDD1 generated by the first voltage generator LDO1 of the lower chip CH2 to the first conductive line ML1, a PV2 for transmitting the third voltage VDD3 generated by the second voltage generator LDO2 of the lower chip CH2 to the second conductive line ML2, and a PV3 for transmitting the VDD2 supplied from the outside of the image sensor to the third conductive line ML3. Each of the first to third conductive lines ML1 to ML3 may be connected in a mesh shape to form a uniform voltage distribution according to positions.

Figure 8:
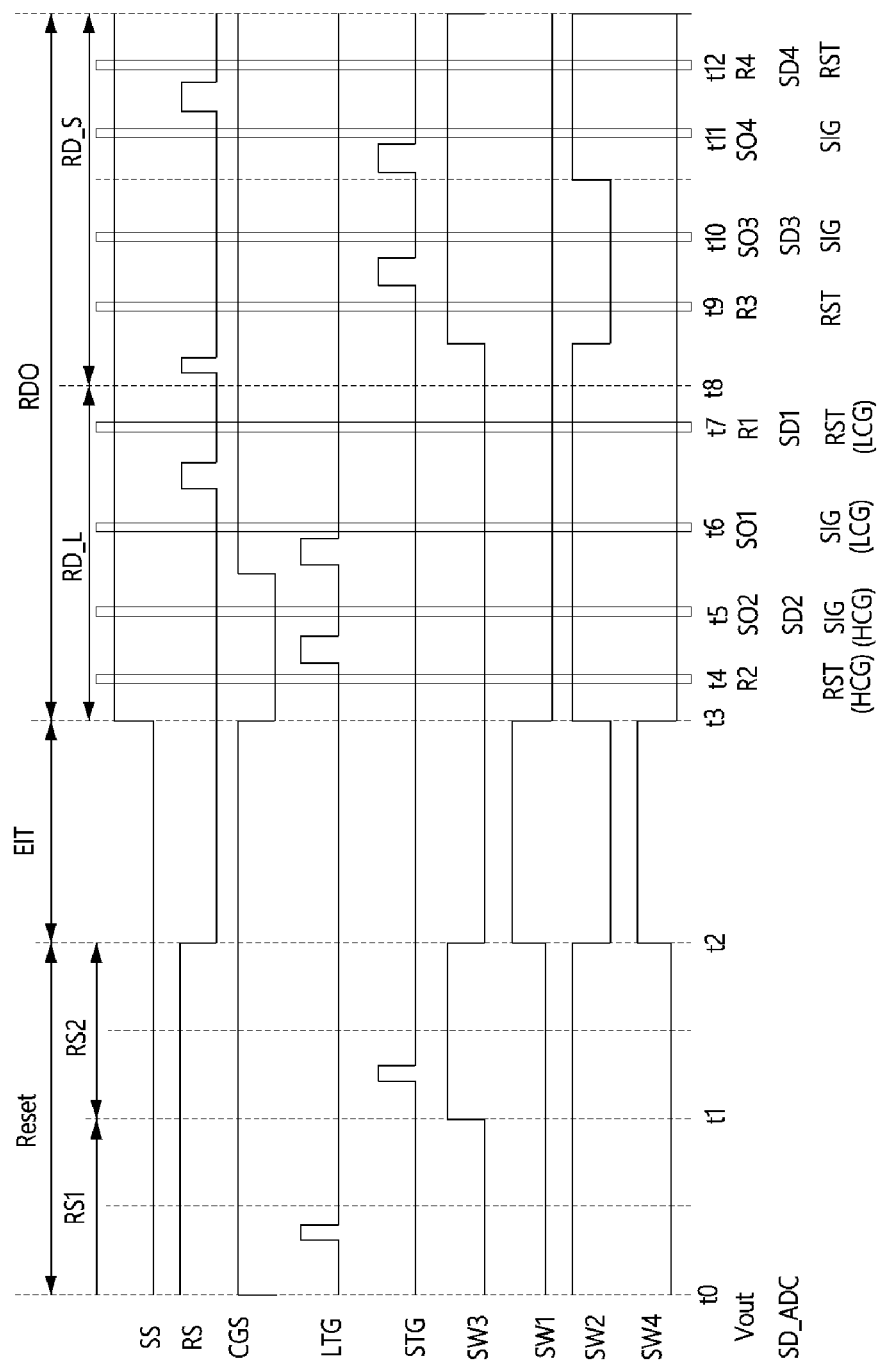
FIG. 8 is an operation timing diagram of the pixel of FIG. 6 according to an example embodiment of the present disclosure.

FIG. 8 is an operation timing diagram of the pixel of FIG. 6 according to an example embodiment of the present disclosure. In the timing diagram of FIG. 8, a control signal SW4 of the drain control transistor DCT is further indicated, including the control signals of FIG. 5. Compared to FIG. 5, a description of the same operating period will be omitted and different operating periods will be described.

In the reset period, the second capacitor switch signal SW2 is maintained at a high level to turn on the CCT2 to transmit the third voltage VDD3, which is an output of the second voltage generator LDO2, to the node N1. The RT is turned on by maintaining the RS at a high level to reset the floating nodes, LPD, SC, and SPD to the third voltage VDD3, which is the output of the second voltage generator LDO2. That is, in the reset period, the reset is performed using a more stable voltage generated from a voltage generator inside the image sensor rather than an externally applied voltage.

In the exposure period, the RT is turned off by maintaining the RS at a low level, and the DCT is turned on by maintaining the SW4 at a high level to transmit the second voltage VDD2 supplied from the outside of the image sensor to the third floating node FD3. When the amount of charges generated by the first photodiode LPD in the exposure period exceeds the FWC and overflows, the charges that overflow may be drained to the voltage VDD2 supplied from the outside of the image sensor, not the voltage generated inside the image sensor.

At the time t3 of the first photodiode LPD read period RD_L, in a state in which the conversion gain transistor CGT is turned off by maintaining the conversion control signal CGS at a low level, that is, in the HCG state, the second reset signal R2 is output at the time t4, the LTG is toggled to transmit the charges generated from the first photodiode LPD to the floating node FD1, and then the second output signal SO2 is output at the time t5. After the time t5, in a state in which the conversion gain transistor CGT is turned on by maintaining the conversion control signal CGS at a light level, that is, an LCG state, the SO1 is output at the time t6, the RS is toggled and is reset to the third voltage VDD3, and then the first reset signal R1 is output at the time t7. The ADC block 130 generates the SD2 corresponding to a high conversion gain HCG by performing the first CDS using the second reset signal R2 and the second output signal SO2, and generates the SD1 corresponding to a low conversion gain LCG by performing the second CDS using the SO1 and the R1.

The second photodiode SPD read period RD_S has the same movement of control signals as the RD_S period of FIG. 5, except that the SW4 is maintained at a low level. However, the second photodiode SPD read period RD_S has the same movement of control signals as the RD_S period of FIG. 5, except that the third voltage VDD3, which is the generated voltage of the second voltage generator LDO2 of the image sensor, is transmitted to the node N1 during a high level period of second capacitor switch signal SW2.

Comparing FIG. 5 and FIG. 8 with each other, when the charges generated by the first photodiode LPD are read in the order of R1-R2-SO1-SO2, the ADC block performs only the first CDS. Therefore, an influence of Power Supply Rejection Ratio (PSPR) may be minimized even when an externally supplied voltage is used in the reset period and readout period. When the charges generated by the first photodiode LPD are read in the order of R2-SO2-SO1-R1, the ADC block performs the first CDS and the second CDS. Therefore, the influence of PSRR may be minimized by using the voltages of the internal voltage generator even in the reset period and readout period.

Figure 9:
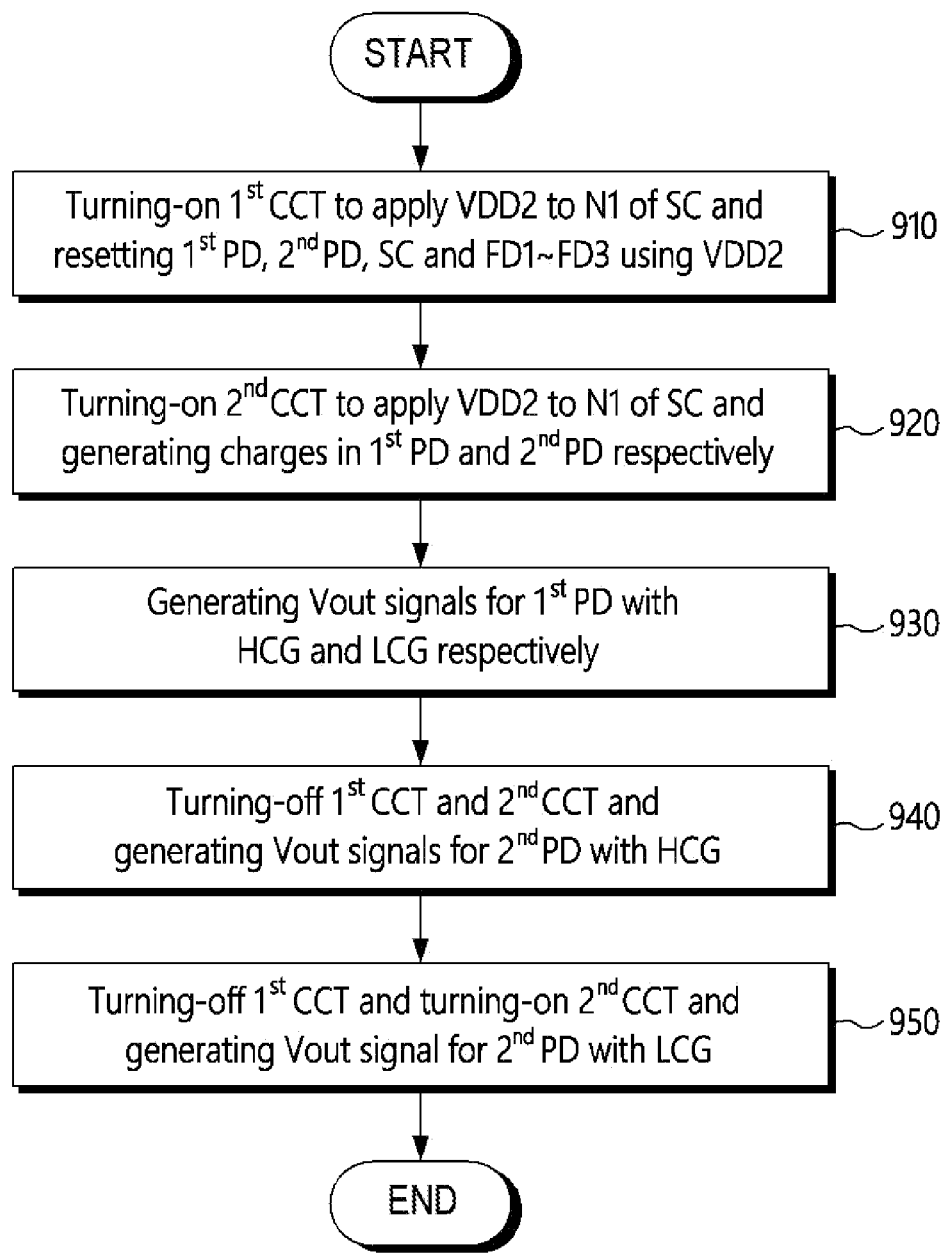
FIG. 9 is a flowchart describing an operation of the pixel of FIG. 3 according to an example embodiment of the present disclosure.

FIG. 9 is a flowchart describing an operation of the pixel according to an example embodiment of the present disclosure. The operation flowchart described in FIG. 9 may be performed by the pixel of FIG. 3. Referring to FIG. 9, the operation of the pixel includes a step (910) of turning on the CCT2 to apply the second voltage VDD2 transmitted through the second conductive line ML2 to the node N1 connected to the second terminal of the storage capacitor SC and resetting the storage capacitor SC, the floating nodes FD1 to FD3, the first photodiode LPD, and the second photodiode SPD using the second voltage VDD2, an exposure step (920) of turning on the CCT1 to apply the first voltage VDD1 transmitted through the first conductive line ML1 to the second node N1 of the storage capacitor and generating charge in response to light received from the first photodiode LPD and SPD, respectively, a step (930) of outputting first and second sub-output signals by converting the charges generated by the first photodiode LPD with the HCG and the LCG, a step (940) of turning off the CCT1 and the CCT2 to float the second node N1 and outputting the third sub-output signal by converting the charges generated by the second photodiode SPD with the HCG, and a step (950) of turning on the CCT2 to apply the second voltage VDD2 to the node N1 connected to the second terminal of the storage capacitor SC and outputting the fourth sub-output signal by converting the charges generated by the second photodiode SPD with the LCG. The first voltage VDD1 is a voltage generated by the voltage generator and has a smaller level than the second voltage VDD2 supplied to the outside.

Figure 10:
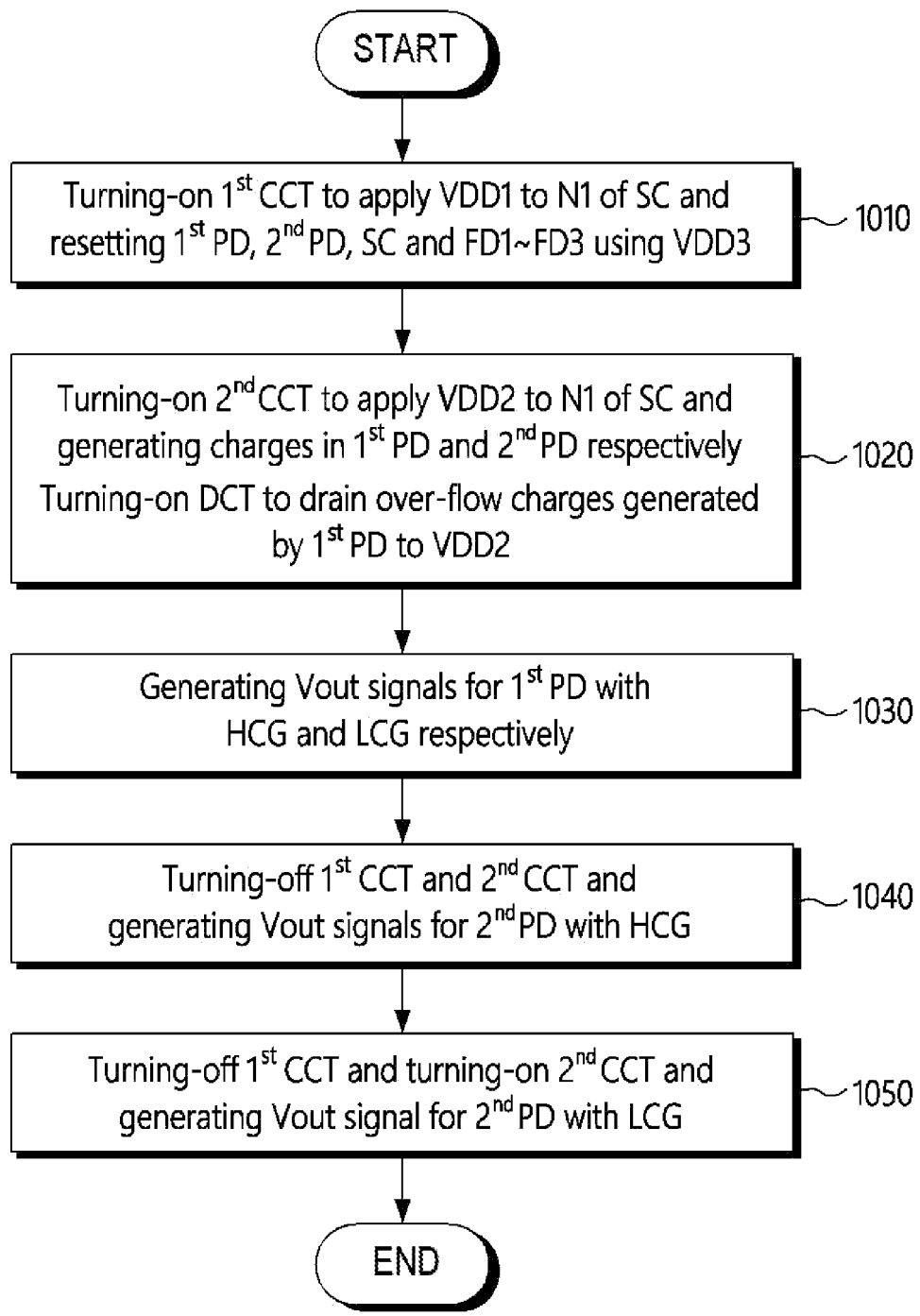
FIG. 10 is a flowchart describing an operation of the pixel of FIG. 6 according to an example embodiment of the present disclosure.

FIG. 10 is a flowchart describing an operation of the pixel according to an example embodiment of the present disclosure. The operation flowchart described in FIG. 10 may be performed by the pixel of FIG. 8. Referring to FIG. 10, the operation of the pixel 600 includes a step (1010) of turning on the CCT2 to apply the third voltage VDD3 to the second node N1 of the storage capacitor SC through the second conductive line ML2 and resetting the storage capacitor SC, the floating nodes FD1 to FD3, the first photodiode LPD, and the second photodiode SPD using the third voltage VDD3, an exposure step (1020) of turning on the CCT1 to apply the first voltage VDD1 transmitted through the first conductive line ML1 to the node N1 connected to the second terminal of the storage capacitor, generating charge in response to light received from the first photodiode LPD and SPD, respectively, and turning on the DCT to remove the charges that are generated by the first photodiode LPD and overflow with the second voltage VDD2, a step (1030) of outputting first and second sub-output signals by converting the charges generated by the first photodiode LPD with the HCG and the LCG, a step (1040) of turning off the CCT1 and the CCT2 to float the node N1 connected to the second terminal of the storage capacitor SC and outputting the third sub-output signal by converting the charges generated by the second photodiode SPD with the HCG, and a step (1050) of turning on the CCT2 to apply the third voltage VDD3 to the node N1 connected to the second terminal of the storage capacitor SC and outputting the fourth sub-output signal by converting the charges generated by the second photodiode SPD with the LCG. The third voltage VDD3 and the first voltage VDD1 are voltages generated from a voltage generator, respectively, and the second voltage VDD2 is a voltage supplied from the outside. The first voltage VDD1 may have a level smaller than that of the second voltage VDD2 and the third voltage VDD3. The second voltage may have the same level as the third voltage.

The image sensor to which the pixel described above is applied may secure a high dynamic range DR capable of expressing a strong high illumination environment and a low illumination environment such as under a tree or in a tunnel at once.

In concluding the detailed description, those skilled in the art will appreciate that many variations and modifications may be made to the example embodiments without substantially departing from the principles provided herein. Therefore, the example embodiments are used in a generic and descriptive sense only and not for purposes of limitation.

What is claimed is:

1. An image sensor comprising:
a first photodiode;
a first floating node;
a first transmission transistor positioned between the first photodiode and the first floating node and configured to transmit first charges generated by the first photodiode to the first floating node based on a first transmission control signal;
a second photodiode;
a second floating node;
a second transmission transistor positioned between the second photodiode and the second floating node and configured to transmit second charges generated by the second photodiode to the second floating node based on a second transmission control signal;
a storage capacitor comprising a first node connected to the second floating node;
a first capacitor control transistor connected to a second node of the storage capacitor and configured to receive a first voltage;
a second capacitor control transistor connected to the second node of the storage capacitor and configured to receive a second voltage;
a connection transistor configured to connect the second floating node and a third floating node;
a conversion gain control transistor configured to connect the third floating node and the first floating node;
a reset transistor connected to the third floating node and configured to receive the second voltage; and
a driving transistor connected to the first floating node and configured to receive the second voltage, and
wherein the first voltage is different from the second voltage.

2. The image sensor of claim 1, wherein a first light receiving area of the first photodiode is greater than a second light receiving area of the second photodiode.

3. The image sensor of claim 1, wherein a first level of the first voltage is smaller than a second level of the second voltage.

4. The image sensor of claim 3, wherein the image sensor further comprises a voltage generator configured to generate the first voltage, and
wherein the second voltage is applied from an outside of the image sensor.

5. The image sensor of claim 4, wherein the first voltage is transmitted to the first capacitor control transistor through a first conductive line, and the second voltage is transmitted to the second capacitor control transistor and the reset transistor through a second conductive line.

6. The image sensor of claim 5, wherein a read circuit of the image sensor is configured to receive the second voltage through a third conductive line and generate a pixel output signal using the second voltage, and
wherein the third conductive line is a different from the second conductive line.

7. The image sensor of claim 1, further comprising a control transistor configured to transmit a third voltage to the third floating node,
wherein a read circuit of the image sensor is configured to generate a pixel output signal using the third voltage.

8. The image sensor of claim 7, wherein a first level of the first voltage is smaller than a second level of the second voltage and a third level of the third voltage, and
wherein the second level of the second voltage and the third level of the third voltage are the same.

9. The image sensor of claim 8, wherein the first voltage and the second voltage are respectively generated from a first voltage generator and a second voltage generator of the image sensor comprising a pixel, and
wherein the third voltage is applied from an outside of the image sensor.

10. The image sensor of claim 9, wherein the first voltage is transmitted to the first capacitor control transistor through a first conductive line,
wherein the second voltage is transmitted to the second capacitor control transistor and the reset transistor through a second conductive line, and
wherein the third voltage is transmitted to the control transistor and the read circuit through a third conductive line.

11. An image sensor comprising:
an upper chip comprising:
a pixel area comprising a plurality of pixels arranged in a plurality of rows and columns;
a guard ring area surrounding the pixel area;
a through via area; and
a pad area comprising a power pad; and
a lower chip comprising a driving driver configured to provide control signals to the plurality of pixels and a first voltage generator,
wherein a first pixel of the plurality of pixels comprises:
a first photodiode;
a first floating node;
a first transmission transistor configured to connect the first photodiode and the first floating node;
a second photodiode;
a second floating node;
a second transmission transistor configured to connect the second photodiode and the second floating node;
a storage capacitor having a first end connected to the second floating node;
a first capacitor control transistor configured to transmit a first voltage generated by the first voltage generator to a second end of the storage capacitor;
a second capacitor control transistor configured to transmit a second voltage to the second end of the storage capacitor;
a connection transistor configured to connect the second floating node and a third floating node;
a conversion gain control transistor configured to connect the third floating node and the first floating node;
a reset transistor configured to transmit the second voltage to the third floating node; and
a read circuit configured to output a pixel output signal to a column line in response to a voltage of the first floating node;
wherein the upper chip further comprises first conductive lines for transmitting the first voltage and second conductive lines for transmitting the second voltage,
wherein the first conductive lines and the second conductive lines are disposed above the pixel area in units of rows,
wherein the first conductive lines are connected to each other in the guard ring area, and
wherein the first conductive lines are configured to receive the first voltage from the lower chip through a first through via of the through via area.

12. The image sensor of claim 11, wherein the upper chip further comprises third conductive lines for transmitting the second voltage,
wherein the third conductive lines are disposed above the pixel area in units of rows,
wherein the second voltage is transmitted from the power pad, and
wherein the second conductive lines and the third conductive lines are connected to each other in the guard ring area.

13. The image sensor of claim 12, wherein the second conductive lines and the third conductive lines are not connected to each other above the pixel area.

14. The image sensor of claim 13, wherein the read circuit is further configured to receive the second voltage through at least one of the third conductive lines and output a pixel output voltage.

15. The image sensor of claim 14, wherein the first conductive lines, the second conductive lines and the third conductive lines are disposed in a mesh shape above the pixel area, respectively.

16. The image sensor of claim 15, wherein a first level of the first voltage is smaller than a level of the second voltage.

17. The image sensor of claim 12, wherein the lower chip further comprises a second voltage generator configured to generate the second voltage, and
wherein the first pixel further comprises a control transistor configured to provide a third voltage to the third floating node through a second through via of the through via area and a third conductive line.

18. The image sensor of claim 17, wherein the read circuit is further configured to receive the third voltage through the third conductive line and output a pixel output voltage.

19. The image sensor of claim 18, wherein a first level of the first voltage is smaller than a second level of the second voltage and a third level of the third voltage, and
wherein the second level of the second voltage and the third level of the third voltage are the same.

20. An operating method of a pixel comprising a first photodiode, a second photodiode having a smaller light receiving area than the first photodiode, a storage capacitor configured to store second charges generated by the second photodiode, and a plurality of floating nodes, the operating method comprising:
turning on a first capacitor control transistor to apply a first voltage to a first node of the storage capacitor and resetting the first photodiode, the second photodiode, the plurality of floating nodes, and the storage capacitor using the first voltage;
after the resetting, an exposure operation of turning off the first capacitor control transistor and turning on a second capacitor control transistor to apply a second voltage to the first node of the storage capacitor and generating cumulative charges based on light received from the first photodiode and the second photodiode;
after the exposure operation, turning off the first capacitor control transistor and the second capacitor control transistor, floating the first node of the storage capacitor, and generating a first output signal based on the second charges generated by the second photodiode; and
after the generating the first output signal, turning off the first capacitor control transistor and turning on the second capacitor control transistor to apply the second voltage to the first node of the storage capacitor and outputting a second output signal in response to the second charges stored in the storage capacitor and generated by the second photodiode.

* * * * *